(12) United States Patent
Hudson

(10) Patent No.: US 9,936,779 B1
(45) Date of Patent: Apr. 10, 2018

(54) GARMENT BAG WITH DETACHABLE TOTE

(71) Applicant: RJH Creative Solutions, LLC, Columbus, GA (US)

(72) Inventor: Rashmi Jain Hudson, Columbus, GA (US)

(73) Assignee: RJH CREATIVE SOLUTIONS, LLC, Columbus, GA (US)

( * ) Notice: Subject to any disclaimer, the term of this patent is extended or adjusted under 35 U.S.C. 154(b) by 0 days.

(21) Appl. No.: 14/698,580

(22) Filed: Apr. 28, 2015

(51) Int. Cl.
*B65D 33/04* (2006.01)
*A45C 7/00* (2006.01)
*A45C 3/00* (2006.01)
*A45C 13/10* (2006.01)

(52) U.S. Cl.
CPC ............ *A45C 7/0086* (2013.01); *A45C 3/004* (2013.01); *A45C 13/1076* (2013.01); *A45C 2003/008* (2013.01); *A45C 2013/1015* (2013.01)

(58) Field of Classification Search
CPC ...... B65D 85/185; B65D 85/18; A45C 3/004; A45C 13/03; A47G 25/54
USPC .... 206/279, 278, 287, 287.1, 289, 292, 298; D3/278, 279, 289, 299, 315; 150/103, 150/104, 107, 11; 190/100–115, 18 A
See application file for complete search history.

(56) References Cited

U.S. PATENT DOCUMENTS

| | | |
|---|---|---|
| 3,115,959 A | 12/1963 | Jaffe |
| 3,831,740 A | 8/1974 | Pendergast |
| 4,170,282 A * | 10/1979 | Schwartzstein ...... A45C 7/0086 190/108 |
| 4,189,036 A | 2/1980 | Pelavin |
| 4,420,068 A * | 12/1983 | Gerch .................... A45C 3/004 190/102 |
| 4,502,576 A | 3/1985 | Reardon |
| 4,542,824 A | 9/1985 | Allen |
| 4,598,803 A * | 7/1986 | Ghiassi ................ A45C 7/0086 190/102 |
| D292,745 S | 11/1987 | Allen |
| 4,817,791 A | 4/1989 | Adams |
| 4,998,603 A | 3/1991 | Nordstrom |
| 5,090,559 A | 2/1992 | Gendreau |
| 5,210,891 A * | 5/1993 | Avital ...................... A45C 3/10 224/156 |
| 5,566,797 A * | 10/1996 | Van Himbeeck ...... A45C 3/004 190/102 |
| 6,223,367 B1 * | 5/2001 | French .................... A45C 3/10 383/4 |
| 7,416,066 B2 * | 8/2008 | Chernoff ................ A45C 3/004 190/108 |

(Continued)

FOREIGN PATENT DOCUMENTS

| | | | | |
|---|---|---|---|---|
| CA | 1119132 | 3/1982 | | |
| GB | 2243764 | 11/1991 | | |
| WO | WO 2005002383 A1 * | 1/2005 | .......... | A45C 7/0045 |

*Primary Examiner* — Fenn C Mathew
*Assistant Examiner* — Cynthia Collado
(74) *Attorney, Agent, or Firm* — Thomas G. Peterson; Bradley Arant Boult Cummings LLP

(57) ABSTRACT

A reusable garment bag with a detachable tote which allows for ease of packing, storage and travel. Hanging clothes can be stored in the garment bag, while the detachable tote can be used to carry other items of clothing, shoes, accessories, and toiletries. The garment bag and detachable accessory disclosed can be rolled into a compact configuration that allows for easy transport.

9 Claims, 8 Drawing Sheets

(56) References Cited

U.S. PATENT DOCUMENTS

| | | |
|---|---|---|
| 8,201,684 B2 | 6/2012 | Torrellas |
| 8,235,206 B2 | 8/2012 | Siegel et al. |
| 9,101,199 B1 * | 8/2015 | Harry ........................ A45F 4/02 |
| 2010/0006459 A1 | 1/2010 | Foley |
| 2010/0032459 A1 * | 2/2010 | Clark ........................ A45F 4/06 |
| | | 224/154 |
| 2017/0020250 A1 * | 1/2017 | Boschan .................. A45C 5/06 |

* cited by examiner

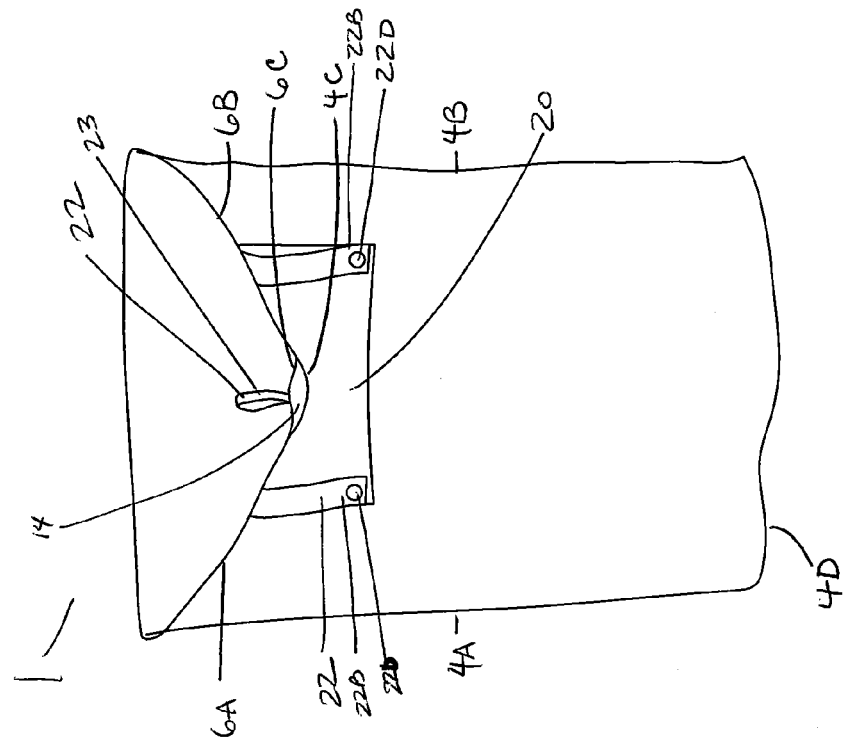
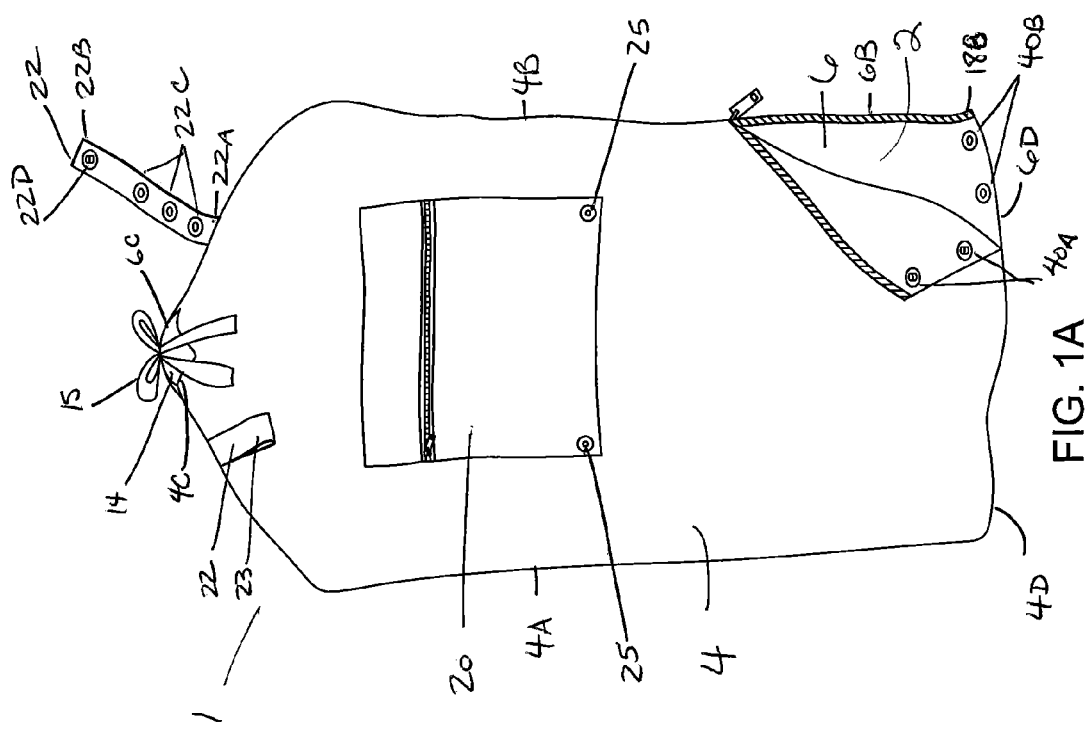
FIG. 1B
FIG. 1A

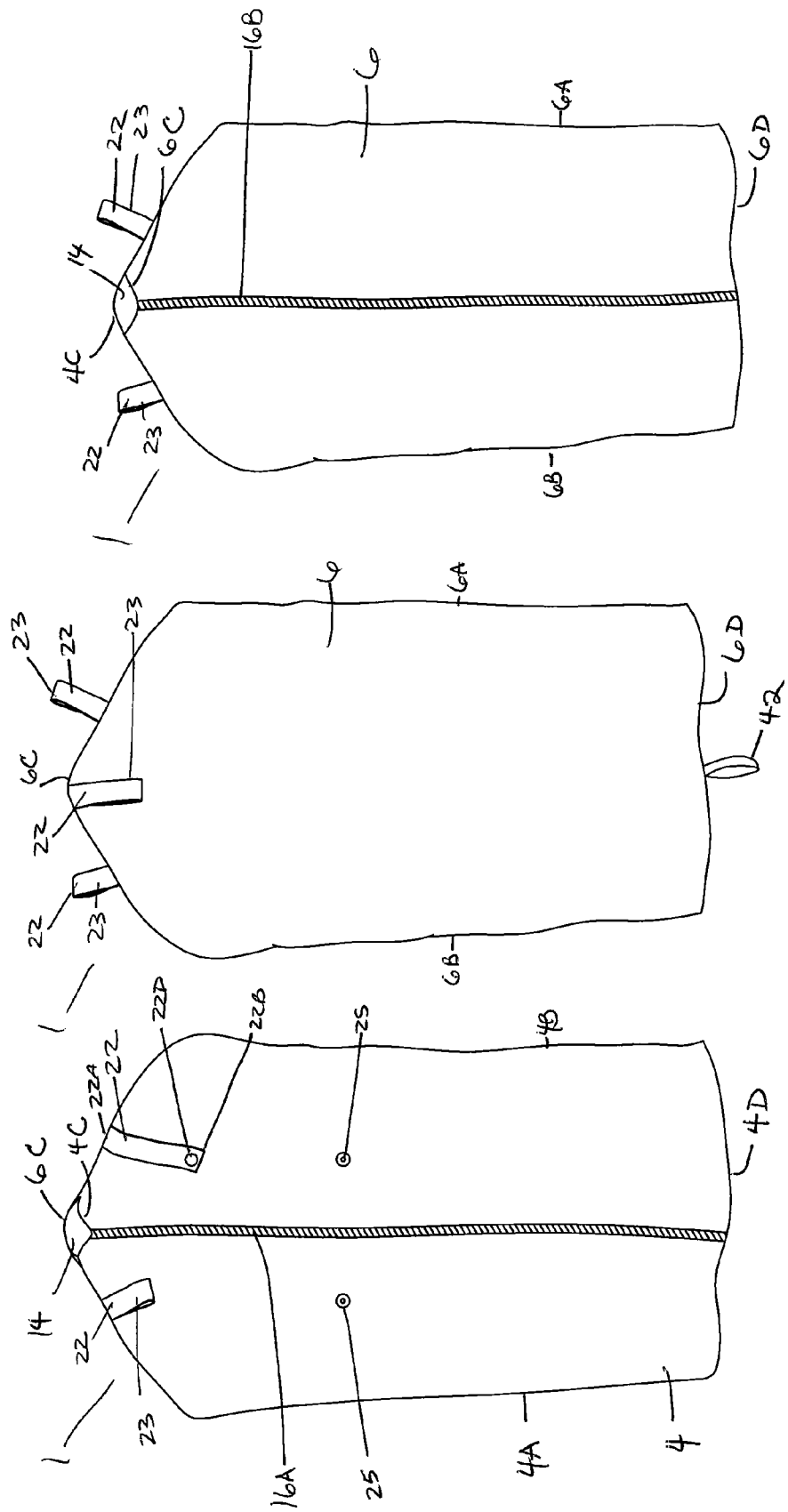

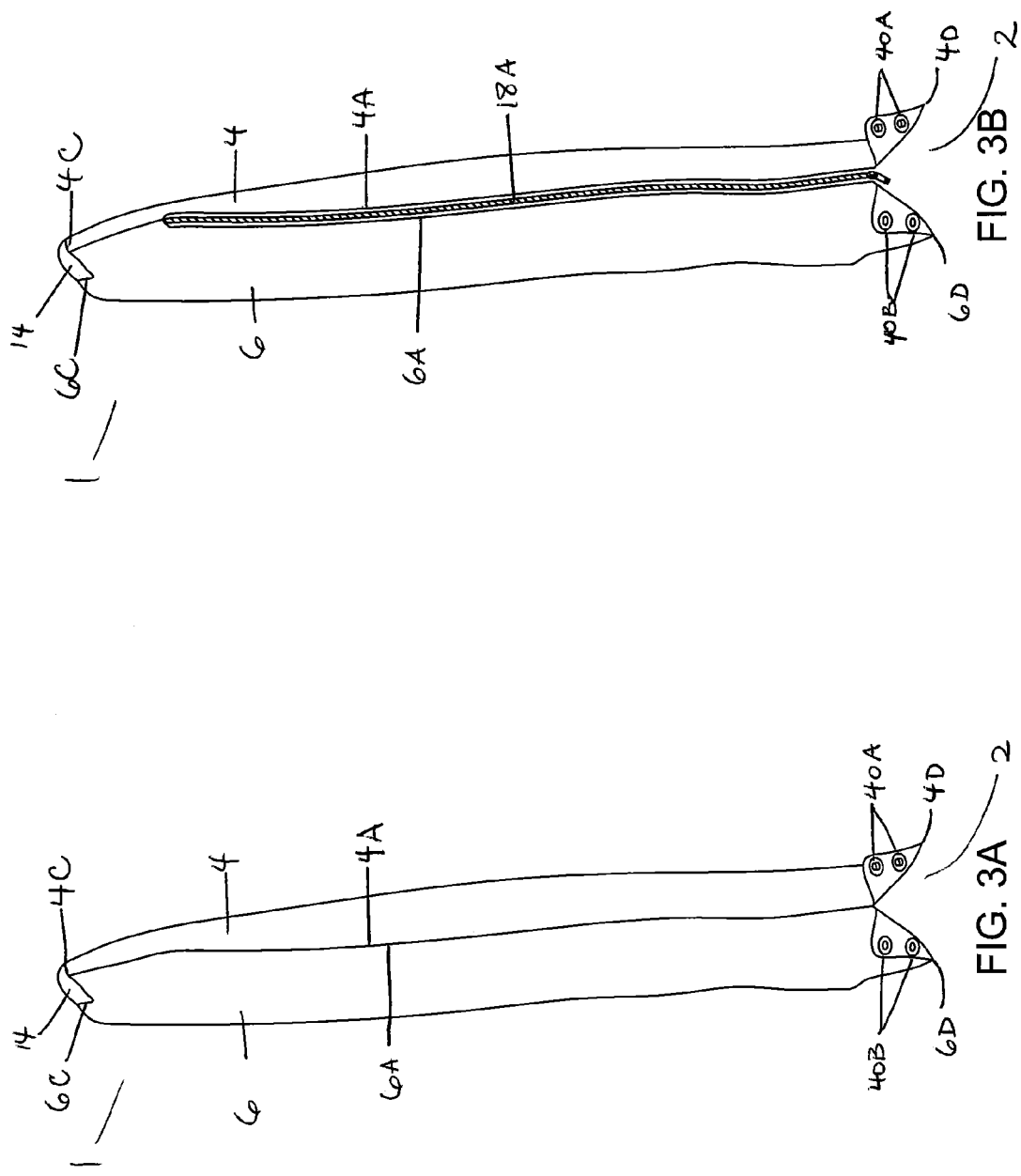

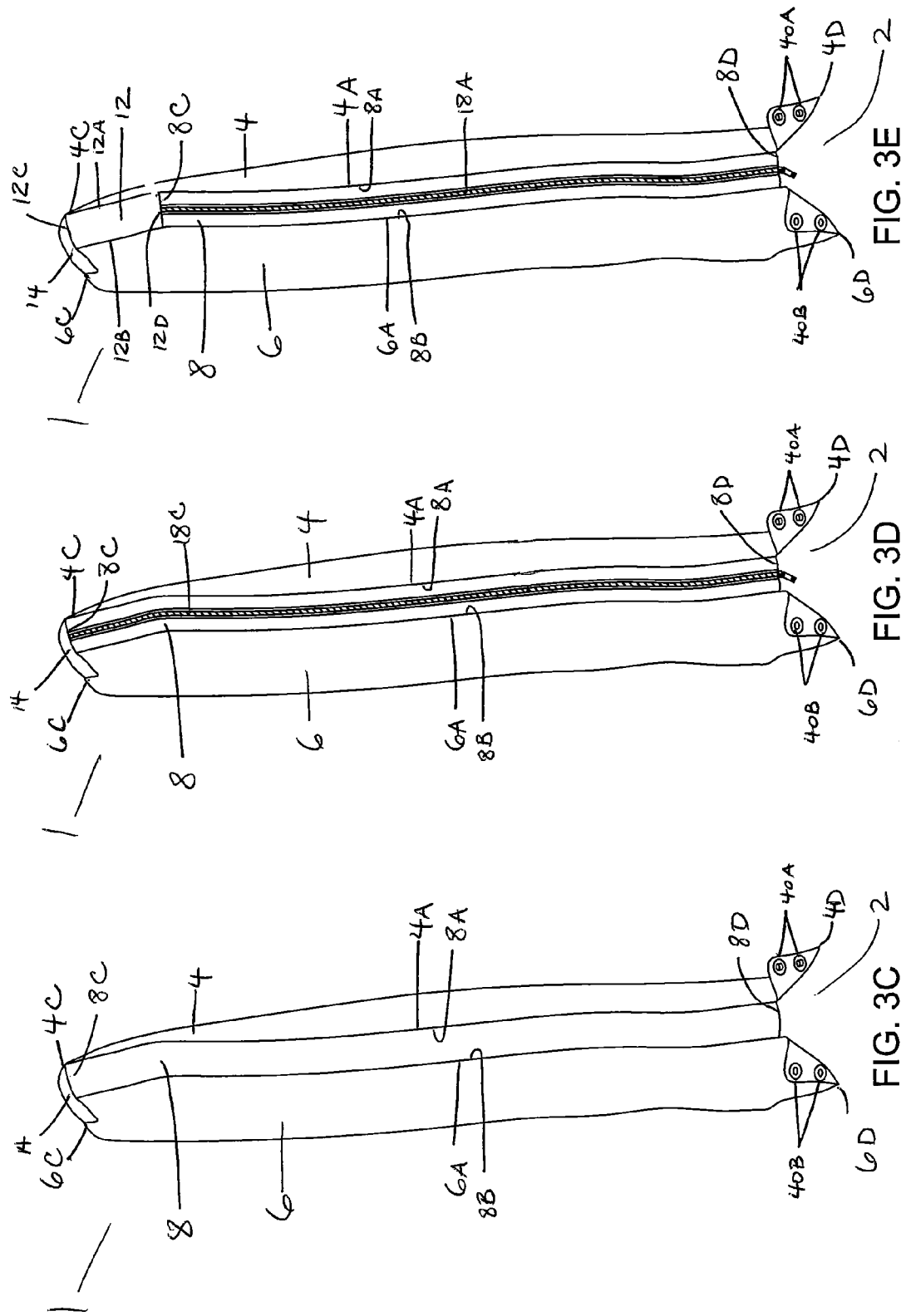

GARMENT BAG WITH DETACHABLE TOTE

BACKGROUND OF THE DISCLOSURE

Field of the Disclosure

The invention relates to garment bags, and more particularly to a reusable garment bag with a detachable tote which allows for ease of packing, storage and travel.

Background

Individuals in today's society are confronted with the need to transport garments on a variety of occasions. These occasions can include lengthy vacations, overnight business travel, quick weekend trips with friends and family, local events requiring a change of wardrobe such as a wedding or dance recital, morning exercise classes or trips to or from the dry cleaner. A wide variety of bags may be used for transporting clothing, and the destination or purpose may dictate the specific transportation needs. For example, a lengthy vacation may require a significant amount of sturdy luggage. A quick business trip may require an overnight bag or a garment bag to protect suits. A weekend car trip may require the ability to carry a few hanging garments as well as shoes, accessories, and toiletry bags. A local wedding or dance recital may require the ability to carry formal wear or recital clothing and the appropriate footwear and accessories. A trip to an exercise class may require a change of clothing, additional accessories, or specific exercise equipment. A trip to or from the dry cleaner may require a bag that is suitable for carrying dirty laundry to the cleaner and clean clothing back.

Many prior art garment bags are sturdy pieces of luggage, reinforced for strength and durability, necessary features in bags which may be handled by airlines or other common carrier services. Such strength and durability, however, come with a price in the form of weight and rigidity. Therefore, such bags may not be desirable for a quick weekend trip or use in traveling to a local event, where a quick, convenient, lightweight option is more desirable, and durability sufficient to withstand repeated rough handling is unnecessary. In addition, the lightweight garment bag protects the contents from dust, dirt and other environmental factors.

Many prior art garment bags are designed to be folded to facilitate carrying, and to allow the bags to be taken as carry-on luggage on an airplane. Generally, such bags are designed to fold in half, with a closure mechanism to maintain the folded configuration. Often this configuration is bulky.

Often prior art garment bags have included zippered compartments or pouches for holding small items. Such compartments may be on the interior or exterior of the bag, or both. In some cases, the pouches or compartments may be large enough to accommodate shoes or accessories. Such bags may be unsuitable for carrying additional items of clothing necessary for a trip, or for carrying accessories or toiletries, and therefore a second bag is necessary to accommodate these items.

In some cases, a prior art bag may incorporate another piece of luggage suitable for carrying folded clothing or other larger items. Such bags are generally quite bulky due to the combined bulk of a large, sturdy garment bag, and equally sturdy suitcase or duffle. Some such bags have incorporated hard-sided luggage resembling a briefcase. The overall effect has been a bulky, heavy, and generally unwieldy luggage combination that is generally undesirable for an individual with only a few items to carry, such as an individual making a short trip, or one making a local trip that requires a change of clothing.

There remains a need for a light-weight versatile bag which is appropriate for quick weekend trips and local use and allows convenient and easy transportation of hanging garments, other items of clothing, shoes, and accessories. The present invention addresses this need.

SUMMARY OF THE DISCLOSURE

The present invention addresses the need for a light-weight, easily portable bag suitable for use on quick weekend trips or local events requiring a change of clothing. The invention provides for a garment bag with a detachable storage accessory, such as, but not limited to, a tote or duffel, such that hanging clothes can be stored in the garment bag, while the detachable accessory can be used to carry other items of clothing, shoes, accessories, and toiletries. The garment bag and detachable accessory disclosed can be rolled into a compact configuration that allows for easy transport.

Hereinafter, the detachable storage accessory may be referred to as a tote for simplicity, however it is understood that the term tote is exemplary of the concept described and is not limiting to the type of detachable storage accessory that may be used with the garment bag disclosed herein.

Because the tote is detachable, packing and use are convenient. The tote may be removed, placed in a convenient location and filled. In certain embodiments, a full-length side zipper and open bottom of the garment bag may allow full visibility of its contents and for it to be quickly zipped over hanging clothes that remain on a closet hanging rod or hook; the tote may then be attached to seal the bottom opening, and the combination rolled into a compact configuration. An adjustable securing strap encircles the circumference of the rolled configuration of the garment bag and tote, securing the pieces together for transport. An adjustable, removably attached carrying strap provides a means of transporting the tote only, or the rolled configuration of the garment bag and tote. Once the individual arrives at the destination, the garment bag may be hung on a rod or hook using the hangers of the clothing, and the tote may be detached and stored separately for easy access to the contents. Further, if desired, the tote may be used to store soiled clothing to keep it separated from the clean clothing in the garment bag. Because the tote is detachably attached to the bottom opening of the garment bag, it also serves as a mechanism for sealing the bottom opening and protects the clothing from soiling. The tote may also serve as a storage device for the garment bag. The garment bag may be detached, folded or rolled, and secured inside the tote so that it does not become lost.

In a first aspect, the present disclosure provides a garment bag and a detachable storage accessory, such as but not limited to, a tote or a duffel.

In a second aspect, the present disclosure provides a garment bag with an optionally sealable bottom opening.

In a third aspect, the present disclosure provides a garment bag with a detachable storage accessory, such as but not limited to, a tote or a duffel. In a particular embodiment of this aspect, the detachable storage accessory is associated with the garment bag at a bottom portion of the garment bag.

In a fourth aspect, the present disclosure provides a garment bag with one or more extensible side panels and/or an extensible top panel.

In a fifth aspect, the present disclosure provides a garment bag with a sealable opening therein. In a particular embodiment of this aspect, the sealable opening is located on a side portion and/or a front portion of the garment bag.

In a sixth aspect, the present disclosure provides a garment bag with an optionally sealable bottom opening and a detachable storage accessory, such as but not limited to, a tote or a duffel, wherein the detachable storage accessory forms part of the bottom sealing mechanism.

In a seventh aspect, the present disclosure provides a garment bag with an optionally sealable bottom opening, a detachable storage accessory, such as but not limited to, a tote or a duffel, and one or more extensible side panels and/or an extensible top panel, wherein the detachable storage accessory forms part of the bottom sealing mechanism.

In an eighth aspect, the present disclosure provides a garment bag with an optionally sealable bottom opening, a detachable storage accessory, such as but not limited to, a tote or a duffel, one or more extensible side panels and/or an extensible top panel, and a sealable opening on a side portion and/or a front portion, wherein the detachable storage accessory forms part of the bottom seal.

In a ninth aspect, the present disclosure provides a garment bag with a means to secure the bag in a compact configuration where the garment bag is a garment bag of the first, third or sixth through eighth aspects.

BRIEF DESCRIPTION OF THE DRAWINGS

FIG. 1A is a front view of an embodiment of the garment bag in an unfolded configuration.

FIG. 1B is a front view of an embodiment of the garment bag with the top portion folded and secured in preparation for rolling.

FIG. 1C is a front view of an alternative embodiment of the garment bag in an unfolded configuration.

FIGS. 2A-B are rear views of various embodiments of the garment bag in an unfolded configuration.

FIGS. 3A-E are side views of various embodiments of the garment bag in an unfolded configuration.

DETAILED DESCRIPTION

Figure 4:
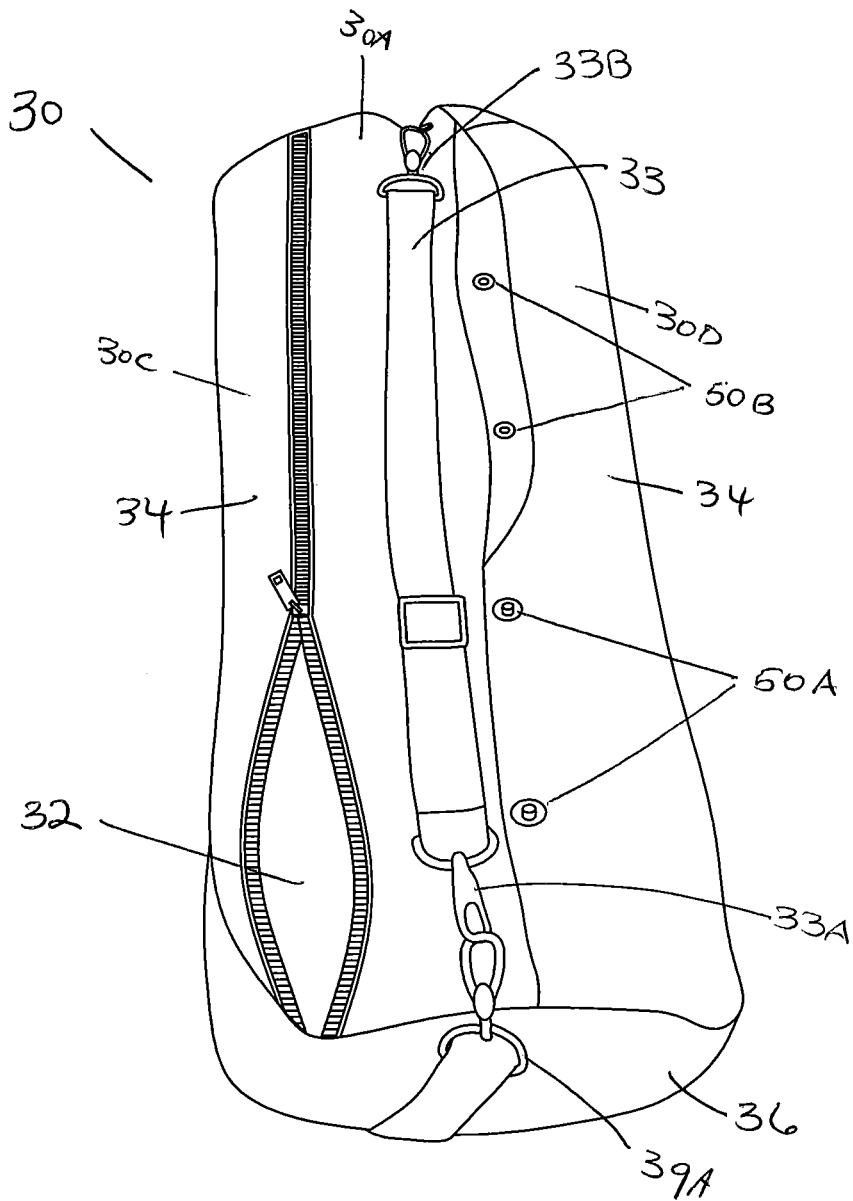
FIG. 4 is a top view of an embodiment of the tote.
Figure 5:
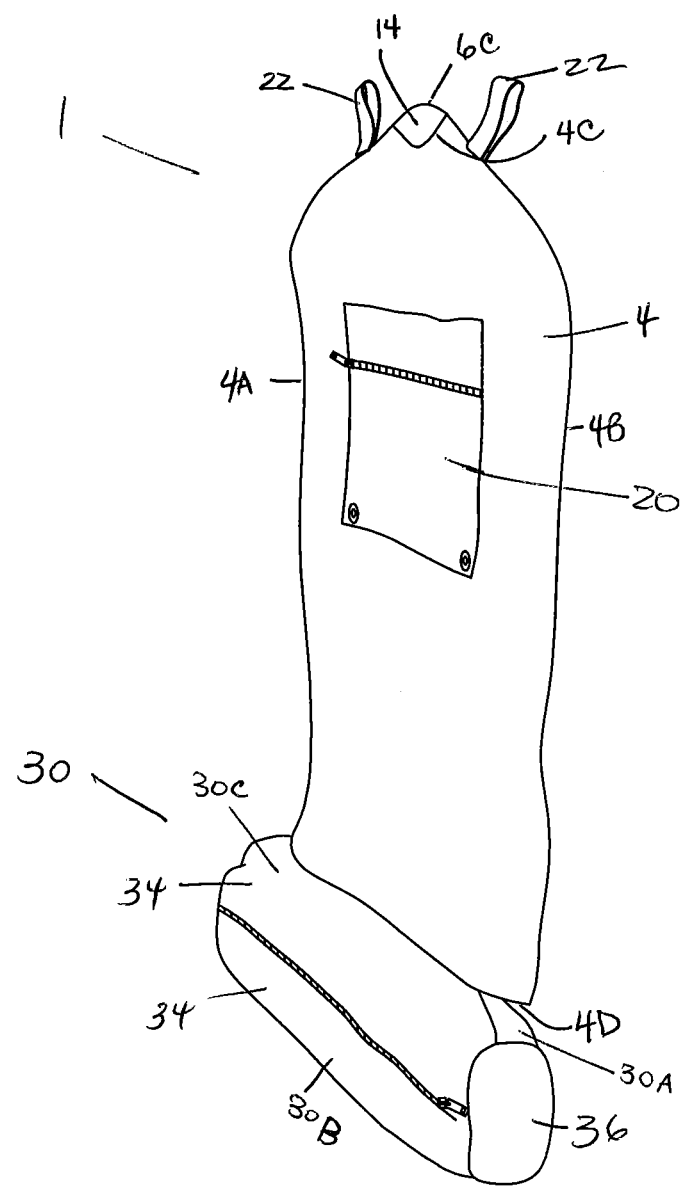
FIG. 5 is a front view of an embodiment of the garment bag and attached tote in an unfolded configuration.
Figure 6:
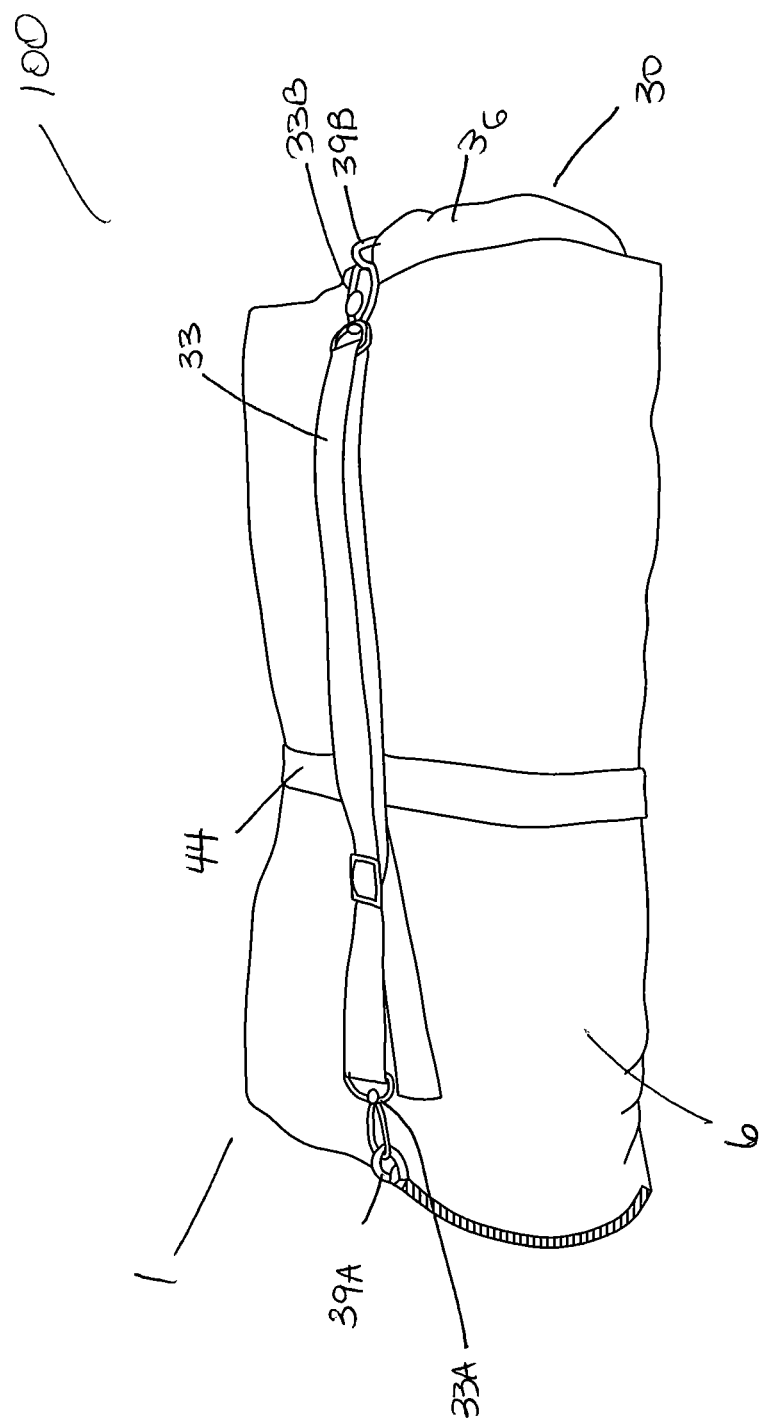
FIG. 6 is a front view of an embodiment of the garment bag and attached tote in a rolled configuration.

FIGS. 1-7 will be used as reference to describe certain embodiments of the garment bag of the present disclosure. FIGS. 1-7 are illustrative in nature and are not meant to limit the present disclosure to the embodiments illustrated.

In one embodiment, the present disclosure provides a light-weight, deformable garment bag 1. The garment bag 1 may be manufactured from any convenient fabric known in the art. In one embodiment, the garment bag 1 is manufactured from a cloth fabric. In another embodiment, the garment bag 1 is manufactured from a-plastic material, which may or may not be completely or partially transparent. In another embodiment, the garment bag 1 is manufactured from a flexible or elastic material (such flexible or elastic material may be a cloth fabric or a plastic). Combinations of the foregoing may also be used. Furthermore, the material from which the garment bag 1 is manufactured may comprise one or more design elements for aesthetic and functional appeal.

In one embodiment, garment bag 1 comprises an interior space 2 bounded by a front panel 4 and a rear panel 6. Each front 4 and rear 6 panel has two side edges (4A/4B and 6A/6B), a top edge (4C and 6C) and a bottom edge (4D and 6D). In one embodiment, the front 4 and rear 6 panels may be joined together along their sides 4A/6A and 4B/6B directly. In another embodiment, the garment bag may comprise one or more side panels 8 and 10. Each side panel has two side edges (8A/8B and 10A/10B), a top edge (8C and 10C) and a bottom edge (8D and 10D). In one embodiment, both side panels 8 and 10 are present; in another embodiment, only 1 side panel 8 or 10 is present. The side panel 8 and side panel 10, when present, are joined to the front 4 and rear 6 panels. For example, when both side panels 8 and 10 are present, side edge 4A of front panel 4 joins side edge 8A and side edge 6A of rear panel 6 joins side edge 8B; likewise, side edge 4B of front panel 4 joins side edge 10A and side edge 6B of rear panel 6 joins side edge 10B.

In one embodiment, the front 4 and rear 6 panels may be joined together along their top edges 4C/6C directly. In another embodiment, the garment bag may comprise a top panel 12. The top panel 12 has two side edges (12A/12B), and two end edges (12C/12D). The top panel 12 when present is joined to the front 4 and rear 6 panels. For example, top edge 4C of front panel 4 joins side edge 12A and top edge 6C of rear panel 6 joins side edge 12B.

In a further embodiment, garment bag 1 comprises a front panel 4, a rear panel 6, one or more side panels 8 and 10 and a top panel 12. In one embodiment, both side panels 8 and 10 are present; in another embodiment, only one side panel 8 or 10 is present. The side panel 8 and side panel 10, when present, are joined to the front 4 and rear 6 panels and the top panel 12. For example, when both side panels 8 and 10 and top panel 12 are present, top edge 4C and 6C of front and rear panels 4 and 6 join side edges 12A and 12B, respectively, of top panel 12; side edge 4A of front panel 4 joins side edge 8A of side panel 8, side edge 6A of rear panel 6 joins side edge 8B of side panel 8; side edge 4B of front panel 4 joins side edge 10A of side panel 10, side edge 6B of rear panel 6 joins side edge 10B of side panel 10 and top edge 8C of side panel 8 joins end edge 12C of top panel 12; likewise, top edge 8D of side panel 10 joins the end edge 12D of top panel 12.

In any of the embodiments described above, the interior space 2 is bounded by at least front 4 and rear 6 panels.

In certain embodiments, the side panels 8 and/or 10 are formed of an expansible/elastic material that allows the interior space 2 of the garment bag 1 to expand as needed to accommodate additional items, for example clothing items as needed, while at the same time maintaining a snug fit around the items to restrict its movement within the bag (for example, by maintaining contact of front 4 and or rear 6 panels with the items). Such expansion of the interior space 2 may be beneficial when bulky item are placed in the interior space 2 or when a plurality of items are placed within interior space 2. The top panel 12 may be formed from the same expansible/elastic material. In certain embodiments, only the side panels 8 and/or 10 are formed from the expansible/elastic material. In certain embodiments, the side panels 8 and/or 10 and the top panel 12 are formed from the expansible/elastic material. In other embodiments, the side panels 8 and/or 10 and/or top panel 12 are formed of a completely or partially transparent material (such as, but not limited to plastic or vinyl) to allow visibility of the contents.

The various panels may be joined using any method known in the art. In one embodiment, the panels are joined using stitching. In other embodiment, the panels are joined using an adhesive. In another embodiment, the panels are joined using reversibly engageable structures, such as snaps or hook/loop fasteners, for example Velcro.

The garment bag 1 may further comprise one or more openings in the front 4, rear 6, side 8 and/or 10 and top 12 panels. Such openings allow for convenient access to the interior space 2 to place, remove and/or access items in the interior space 2.

In one embodiment, the garment bag 1 has an opening 14 at the top portion of garment bag 1. The opening 14 may be formed along the line at which top edges 4C and 6C are joined if front 4 and rear 6 panels are joined directly or may be formed in top panel 12 if top panel 12 is present. Opening 14 is advantageously used to allow the passage of the hooks of hangers. In some embodiments, the top portion comprises a securing element 15, such as but not limited to a ribbon, or a strap with a reversible mating element, that allows the hangers on which garments are hung to be secured together for easier transport of the garment bag 1.

In another embodiment, the garment bag 1 may have an opening 16A on front panel 4 and/or an opening 16B on rear panel 6. In one embodiment, only one of openings 16A and 16B are present. In a particular embodiment, only opening 16A is present. Advantageously, the opening 16A and/or 16B may be a sealable opening such that the opening may be reversibly secured so as to be reversibly opened (for example to place items in the interior space 2) and closed (for example, to keep the items secured in the interior space 2). Any means known in the art to reversibly secure the opening may be used. Reversible mating elements, include, but are not limited to, zippers, grommet and stud combination, magnets, ring and hook combination, snaps, buttons or hook/loop fasteners, for example Velcro. Other reversible mating elements may be used as is known in the art. In one embodiment, the reversible mating element is a zipper. In one embodiment, when used herein, the term "reversible mating element" may be complementary portions of a snap assembly, complementary portions of a zipper assembly, complementary portions of a grommet/snap assembly, complementary portions of a button assembly, complementary portions of a ring/hook assembly, complementary portions of a hook/loop assembly or complementary portions of other reversible mating elements as is known in the art. The function of such assemblies is well known in the art.

In one embodiment, the garment bag 1 has an opening 18A and/or 18B at a side portion of garment bag 1. The openings 18A and/or 18B may be formed along the line at which side edges 4A/6A and/or 4B/6B are joined if front 4 and rear 6 panels are joined directly or may be formed in one or both of side panels 8 and 10 if present. In one embodiment, the garment bag 1 may have an opening 18A on side panel 8 and/or an opening 18B on side panel 10, if present. In one embodiment, only 1 of openings 18A and 18B are present. In a particular embodiment, only opening 18A is present. Advantageously, the opening 18A and/or 18B may be a sealable opening such that the opening may be reversibly secured so as to be reversibly opened (for example to place items in the interior space 2) and closed (for example, to keep the items secured in the interior space 2). Any means known in the art to reversibly secure the opening may be used. In one embodiment, a reversible mating element is used to reversibly secure the opening. Reversible mating elements, include, but are not limited to, zippers, grommet and stud combination, magnets, ring and hook combination, snaps, buttons or hook/loop fasteners, for example Velcro. Other reversible mating elements may be used as is known in the art. In one embodiment, the reversible mating element is a zipper.

In one embodiment, the garment bag 1 has an opening 18C and/or 18D at a side portion of garment bag 1 that further extends to the top portion of garment bag 1 as illustrated in FIG. 3D. The opening 18C and 18D may be formed along the line at which side edges 4A/6A and 4C/6C and/or 4B/6B and 4C/6C are joined if front 4 and rear 6 panels are joined directly or may be formed in one or both of side panels 8 and 10 and top panel 12 if present. In one embodiment, the garment bag 1 may have an opening 18C or may have 2 openings 18C and 18D. In one embodiment, only 1 of openings 18C and 18D are present. In a particular embodiment, only opening 18C is present. Advantageously, the opening 18C and/or 18D may be a sealable opening such that the opening may be reversibly secured so as to be reversibly opened (for example to place items in the interior space 2) and closed (for example, to keep the items secured in the interior space 2). Any means known in the art to reversibly secure the opening may be used. In one embodiment, a reversible mating element is used to reversibly secure the opening. Reversible mating elements, include, but are not limited to, zippers, grommet and stud combination, magnets, ring and hook combination, snaps, buttons or hook/loop fasteners, for example Velcro. Other reversible mating elements may be used as is known in the art. In one embodiment, the reversible mating element is a zipper.

In a particular embodiment, the opening 18C and/or 18D runs from the bottom edge 4D/6D to opening 14 in the top portion of garment bag 1 or to a position immediately adjacent to opening 14. As such the garment bag may be conveniently laid open so that front panel 4 or back panel 6 may be folded over to allow for simple access to interior space 2. In another particular embodiment, the opening 18C and/or 18D runs from the bottom edge 4D/6D (or end edge 12C or 12D if panel 12 is present) to opening 14 in the top portion of garment bag 1 or to a position intermediate to opening 14 and the upper end of edges 4A/6A or 4B/6B (or end edge 12C or 12D if panel 12 is present).

In one embodiment, the garment bag 1 has a single sealable opening 18C placed at the junction of side edges 4A/6A wherein the reversible mating element is a zipper assembly. In such an embodiment, the zipper extends from the bottom opening to the top opening 14 of the bag and allows the bag to be unzipped for easy access to interior 2 as described.

In any of the embodiments described above, the openings 16A/B, 18A/B and/or 18C/D extends along at least a portion of the length of the panel in which it is located. For example, an opening on side panel 8 extends along at least a portion of the length of side panel 8. In one embodiment, the opening extends along at least 50%, 75%, 90%, or 99% of the length of the panel on which it is placed. In another embodiment, the opening extends 100% of the length of the panel on which is it placed. Furthermore, as discussed above, an opening may be at the juncture at which two panels meet. For example, in an embodiment that lacks a side panel 8 or 10, the opening is formed at the juncture of side edges 4A/6A or 4B/6B. In such an embodiment, the opening extends along at least 50%, 75%, 90%, or 99% of the length of the juncture. In another embodiment, the opening extends 100% of the length of the juncture. In one embodiment, the opening is sufficiently large that the garment bag 1 may be slipped around hanging garments without the need to remove the garments from the hangers.

Furthermore, the openings 14, 16A/B, 18A/B and/or 18C/D may be centered on the panel in which they are present. In another embodiment, the openings 16A/B, 18A/13 and/or 18C/D may be offset a given distance from the center of the panel in which they are present.

In one embodiment, the garment bag 1 has a top opening 14 and a single side opening 18A. In another embodiment, the garment bag 1 has a top opening 14 and a two side openings 18A and 18B. In another embodiment, the garment bag 1 has a top opening 14 and a front opening 16A. In another embodiment, the garment bag 1 has a top opening 14 and a rear opening 16B. In another embodiment, the garment bag 1 has a top opening 14, a single side opening 18A and a front opening 16A. In another embodiment, the garment bag 1 has a top opening 14, two side openings 18A and 18B and a front opening 16A. In another embodiment, the garment bag 1 has a top opening 14, a single side opening 18A and a rear opening 16B. In another embodiment, the garment bag 1 has a top opening 14, two side openings 18A and 18B and a rear opening 16B.

In some embodiments, one or more pockets 20 may be provided on the exterior, interior or both exterior and interior surfaces of the front 4 or rear 6 panels. Such pockets may in some cases be sealable, such as by a zipper or other mechanism known in the art or described herein.

In some embodiments, one or more tabs 22 may be affixed to the garment bag 1. Each tab 22 has a proximal end 22A and a distal end 22B. In a particular embodiment, the tab 22 is attached to the garment bag 1 at or near the proximal end 22A. In another embodiment, tab 22 is attached to the garment bag 1 at a point in between proximal end 22A and distal end 22B. In one embodiment, the tabs 22 are present on a top portion and/or a middle portion of the front 4 or back 6 panels of the garment bag. Tabs 22 may be present on the exterior, interior, or both exterior and interior surfaces of the front 4 and/or rear 6 panels; furthermore, such tabs may be present on the exterior, interior or both exterior and interior surfaces of top panel 12 when present. In a particular embodiment, the proximal 22A and distal 22B ends contain one half of a reversible mating element, designated 22C and 22D respectively or other joining mechanism, such that the distal end 22B of each tab 22 may be joined to its proximal end 22A to form a loop 23. In one embodiment, more than one element 22C may be placed in a spaced apart configuration along the length of tab 22 such that any one of elements 22C can engage element 22D such that the size of the loop may be adjusted. Such loop may be used to provide an attachment site for scarves, purses, hats, belts or other small items similarly suited for hanging on the panel surface. The length of the tab 22 may be any length desired or any length sufficient to form a loop for accomplishing the functions described herein. In one embodiment, the length is from 3 to 18 inches, from 5 to 15 inches or 5 to 12 inches. In one embodiment, the garment bag 1 contains 2 to 8 tabs 22. In another embodiment, the garment bag 1 contains from 3 to 7 tabs, from 4 to 6 tabs or from 2 to 4 tabs. In a particular embodiment, the garment bag 1 comprises 2 tabs.

In addition to forming loops 23, tabs 22 may also function to secure the top portion of the garment bag 1 and the associated garment hangers when the garment bag 1 is in a compact or folded configuration. In such an embodiment, the tabs 22 (which are affixed to a top portion of the garment bag) extend toward the bottom edges 4D and 6D such that the distal end 22B and its portion of the reversible mating element 22D is spaced apart from proximal end 22A and the top edges 4C and 6C. The garment bag 1 comprises a portion of a reversible mating element (designated 25) that is complementary to the portion of the reversible mating element 22D on the distal end 22B of tab 22 such that the distal end 22B of tab 22 is reversibly associated with the portion of the garment bag to which element 25 is affixed. In one embodiment, the elements 25 are positioned a distance X from the top edges 4C/6C and tab 22 has a length Y, such that X is greater than Y forcing the top portion of garment bag 1 to be folded over onto the face/front panel 4 of garment bag 1 as shown in FIG. 1B.

In certain embodiments, the bottom of the garment bag 1 is reversibly open such that the bottom of the garment bag may be open (i.e., interior space 2 is not bounded on the bottom end) or closed (i.e., interior space 2 is bounded on the bottom end). In one embodiment, complementary portions of a reversible mating element (designated 40A and B) are present on or adjacent to the bottom edges 4D and 6D of the garment bag 1. This allows the user to keep the bottom entirely open, or to seal it to protect the items inside. In one embodiment, the reversible mating elements are snaps. In such an embodiment, complementary portions of the snaps (for example, the male and female portions of the snaps) are arrayed along or adjacent to the bottom edge 4D and 6D on an interior side of front panel 4 and rear panel 6. As such, in one embodiment, the male portion (designated 40A) of the reversible mating element may be positioned along or adjacent to the bottom edge 4D and the female portion (designated 40B) of the reversible mating element may be positioned along or adjacent to the bottom edge 6D. Elements 40A/B may be placed on the exterior or interior face of front 4 and rear 6 panels. For aesthetic reason, it may be desirable to place elements 40A/B on the interior face of front 4 and rear 6 panels. Other configurations of the reversible mating elements are included within the scope of the disclosure, with snaps being exemplary only.

In certain embodiments, a loop 42 is positioned along or adjacent to the bottom edge 4D or 6D. The loop 42 may be positioned on the interior or exterior face of the front 4 or rear 6 panel. The loop 42 is ideally sized to fit over the hook portion of the hangers passed through opening 14. This allows the user to fold the garment bag in half and secure in the folded position by threading the hanger hooks through the loop.

The present disclosure also provides for a tote 30 which may be removably secured to the bottom portion of the garment bag 1, such as on or adjacent to the bottom edges 4D and 6D. The tote may take on any configuration of a storage article known in the art. In one embodiment, the tote 30 comprises an interior space 32 bounded by one or more side panels 34 and two end panels 36. The tote 30 further has a top portion 30A, a bottom portion 30B and two side portions 30C and 30D. The tote 30 may further comprise one or more openings 38 to allow access to the interior space 32. The opening may be reversibly sealed by a reversible mating element as described herein. In one embodiment, the reversible mating element includes, but is not limited to, a zipper, grommet and stud combination, magnet, a ring and hook combination, buttons, snaps or a hook/loop assembly, such as Velcro. In some embodiments the side panel may be a single length of material forming a cylinder or other shape. In other embodiments the side panel may be comprised of discrete side panel members joined at their edge to form a cylinder, rectangular prism or other desired shape. The shape of the tote is not critical to the invention. The tote 30 may further comprise securing elements 39A and 39B on end panels 36 for the convenient attachment of an adjustable carrying strap 33 with a complementary securing element 33A and 33B on each end thereof. The securing elements 39A and 39B and complementary securing elements 33A and 33B may be any such mechanisms known in the art. In one embodiment the securing elements 39A and 39B is a ring and element 33A and 33B is a hook. In one embodiment the securing elements 39A and 39B and/or the complementary securing elements 33A and 33B are swivel hooks.

In one embodiment, the length of the tote as measured from each of end panels 36 is substantially the same as the length of the bottom edges 4D and 6D of the garment bag 1. In another embodiment, the length of the tote as measured from each of end panels 36 is 75%, 85%, 95%, 100%, 105%, 110%, 115%, 120% or 125% (or any range in between the foregoing) of the length of the bottom edges 4D and 6D of the garment bag 1.

In one embodiment, the tote 30 comprises a plurality of reversible mating elements 50A and 50B. The elements 50A and 50B may be placed in any location desired; in one embodiment, the elements 50 are arrayed along top portion 30A or bottom portion 30B. However, elements 50A and 50B may be placed at any location desired. The portion of the reversibly mating elements 50A and 50B on the tote 30 reversibly engage the complementary portion of the reversible mating element 40A and 40B present on the bottom portion of the garment bag 1, such that the interaction of elements 50A/B and 40A/B reversibly secure the tote 30 to the garment bag 1 and further close, at least partially, the bottom portion of the garment bag 1. The elements 50A/B and 40A/B may be complementary portions of a snap assembly, complementary portions of a zipper assembly, complementary portions of a grommet/snap assembly, complementary portions of a button assembly, complementary portions of a ring/hook assembly, complementary portions of a hook/loop assembly or complementary portions of other reversible mating elements as is known in the art. The function of such assemblies is well known in the art.

Figure 7A:
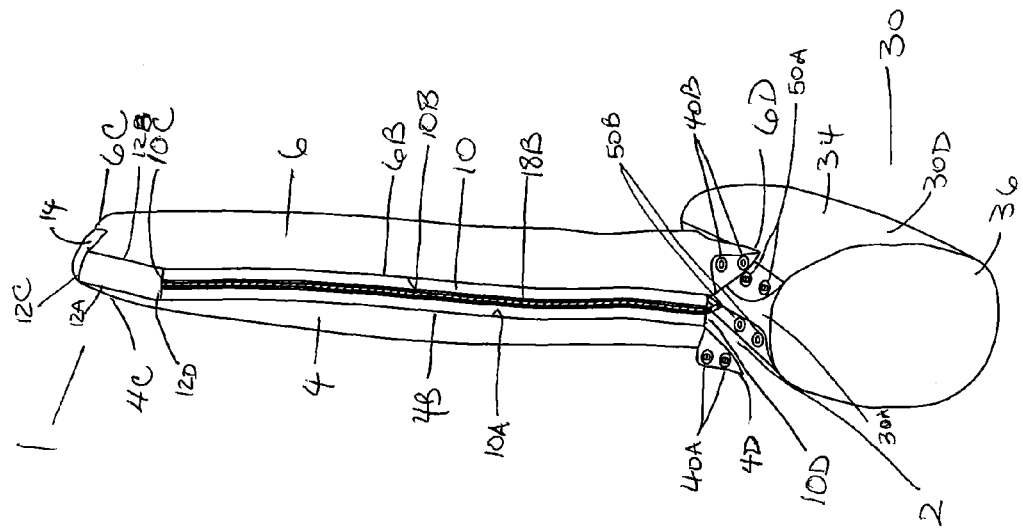
FIGS. 7A-B are side views of various embodiments of the garment bag and attached tote in an unfolded configuration.
Figure 7B:
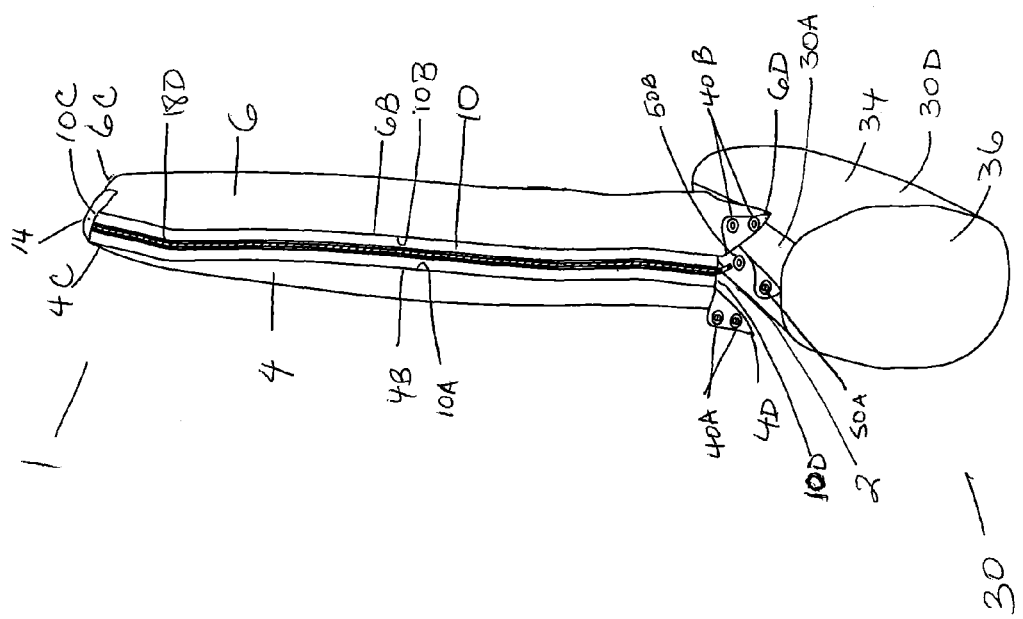

In one embodiment, elements 50A and 50B are arranged in a back-to-back configuration as illustrated in FIG. 7A such that the tote 30 is joined to garment bag 1 along a single line or axis Z. In one embodiment, elements 50A and 50B are arranged in a spaced apart configuration as illustrated in FIG. 7B such that the tote 30 is joined to garment bag 1 along two lines or axes Z* and Z**. Reversible mating elements 40A and 40B may be placed along the bottom edges 4D and 6D or may be placed adjacent bottom edges 4D and 6D.

The garment bag 1 is also configured to be transformed from a first form (i.e., the traditional garment bag form) into a second compact form 100 through the use of the elements disclosed herein. The ability to transform the garment bag into a second compact form provides for ease of transporting the garment bag 1 and allows for a convenient storage of the garment bag 1 in locations in which traditional garment bags are not generally stored (for example in the overhead bin of an airplane). In one embodiment, the compact form is a duffle although other forms may be created. In preparing the garment bag 1 to be converted into the compact form 100, the tote 30 is reversibly secured to the bottom portion of the garment bag 1 as described herein. In addition, the top portion of the garment bag 1 is secured in a downward folded position by tabs 22 and complementary portions of reversible mating elements 22D and 25 as described herein. Furthermore, if the carrying strap 33 is secured to the tote 30, at least one end of carrying strap 33 is released from securing element 39A/39B and placed apart from the tote 30.

Subsequently the tote 30 may be rolled onto the front panel 4 such that the tote 30 is wrapped by garment bag 1, with the end panels 36 exposed and the free end of carrying strap 33 not being contained within the compact form 100. In such a configuration, the garment bag 1 is transformed into a duffel bag like compact form 100. The compact form 100 may be maintained by a securing strap 44 which is wrapped around the circumference and fastened. The securing strap 44 may be fastened around the compact form 100 by any means known in the art. In one embodiment, the securing strap 44 is fastened by tying. In another embodiment, the securing strap is fastened by a buckle. The carrying strap 33 is then secured to the securing elements 39A/39B and the garment bag may be carried like a conventional duffle bag or the like. To restore the compact form 100 to the unfolded conformation, the procedure is reversed.

What is claimed is:

1. A reusable garment bag with detachable tote comprising:
   a. a garment bag comprising an interior space bounded by a front and rear panel joined by a first side panel and a second side panel, wherein the front, rear, and side panels create a closed top with an opening configured to allow the passage of the hook end of one or more hangers, and an open bottom of the bag, and wherein the first side panel contains a zipper running from the bottom opening to the top opening of the garment bag, and wherein there is a ribbon attached at the top opening of the garment bag, and wherein there are a plurality of snaps arrayed along the interior of the bottom opening of the bag;
   b. a detachable tote comprising an interior space bounded by one or more side panels joined by two end panels, with a resealable opening in the side of one side panel of the tote, wherein there is a plurality of snaps arrayed along the top seam of the tote in a configuration that allows the tote to be reversibly attached to the garment bag; and wherein there is a ring attached to the first end panel and the second end panel of the tote;
   c. a removable strap comprising a first end with a snap hook closure and a second end with a snap hook closure to interact with the ring attachment of the tote;
   d. two or more tabs on the front panel of the garment bag, arrayed symmetrically around the top opening, comprising a snap portion at each of a first proximal end and a second distal end of the tab;
   e. two or more snap portions arrayed on an exterior portion of the front panel of the garment bag in a configuration to allow the top portion of the bag to be folded over and secured by interaction of the snap portions with the snap on the distal ends of the tabs.

2. The reusable garment bag with detachable tote of claim 1, wherein the first side panel and second side panel are manufactured from an expandable material.

3. A reusable garment bag with detachable tote comprising:
   a. a garment bag comprising an interior space bounded by a front and rear panel joined by a first side panel and a second side panel, wherein the front, rear, and side panels create a closed top with an opening configured to allow passage of the hook end of one or more hangers, and an open bottom of the bag, and wherein there are a plurality of snaps arrayed along the interior of the bottom opening of the bag;
   b. a detachable tote comprising an interior space bounded by one or more side panels joined by two end panels, with a resealable opening in the side of one side panel of the tote, wherein there is a plurality of snaps arrayed along the top seam of the tote in a configuration that allows the tote to be reversibly attached to the garment bag;

c. two or more tabs on the front panel of the garment bag, arrayed symmetrically around the top opening, wherein each tab has a proximal and a distal end, the proximal and distal ends each having a portion of a reversible mating element configured to allow the tab to be forming into a loop; and d. two or more reversible mating elements arrayed on an exterior portion of the front panel of the garment bag in a configuration to allow the top portion of the bag to be folded over and secured by interaction of the two or more reversible mating elements.

4. The reusable garment bag with detachable tote of claim 3, wherein at least one of the first and second side panels contains a sealable opening.

5. The reusable garment bag with detachable tote of claim 3, wherein at least one of the front and rear panels contains a sealable opening.

6. The reusable garment bag with detachable tote of claim 3, further comprising a ribbon attached at the top opening of the garment bag.

7. The reusable garment bag with detachable tote of claim 3, wherein the detachable tote further comprises a ring attached to the first end panel and the second end panel of the detachable tote.

8. The reusable garment bag with detachable tote of claim 7, further comprising a removable strap comprising a first end with a snap hook closure and a second end with a snap hook closure to interact with the ring of the detachable tote.

9. The reusable garment bag with detachable tote of claim 3, wherein the first side panel and second side panel are manufactured from an expandable material.

* * * * *